United States Patent [19]

Trippel

[11] 4,074,016

[45] Feb. 14, 1978

[54] MAGNETIC RECORD CARRIER

[75] Inventor: Gerhard Trippel, Sindelfingen, Germany

[73] Assignee: International Business Machines Corporation, Armonk, N.Y.

[21] Appl. No.: 749,209

[22] Filed: Dec. 9, 1976

[30] Foreign Application Priority Data

Dec. 17, 1975 Germany .............................. 2556755

[51] Int. Cl.² .............................................. B32B 15/00
[52] U.S. Cl. .................................... 428/626; 428/632; 428/633; 428/660; 428/666; 428/926; 428/928
[58] Field of Search ............... 428/928, 938, 626, 632, 428/629, 633, 926, 666, 660; 230/134

[56] References Cited

U.S. PATENT DOCUMENTS

| | | | |
|---|---|---|---|
| 3,116,159 | 12/1963 | Fisher et al. | 252/62.55 |
| 3,150,939 | 9/1964 | Wenner | 427/131 |
| 3,414,430 | 12/1968 | Maho | 427/132 |
| 3,520,664 | 11/1966 | York | 427/131 |
| 3,730,852 | 5/1973 | Diebold et al. | 204/38 B |

*Primary Examiner*—Arthur J. Steiner
*Attorney, Agent, or Firm*—James A. Pershon

[57] ABSTRACT

A record carrier for a magnetic thin film metal layer includes a substrate coated with a pigmented epoxy resin as a synthetic substance layer. The pigment includes approximately 20% titanium dioxide and approximately 2% aluminum oxide. A thin getter metal layer is deposited over the synthetic substance layer for absorbing the outgasing from the synthetic substance layer. A relatively thicker metal layer such as chromium is then deposited over the getter layer for enhancing the magnetic properties of the subsequently deposited magnetic layer.

14 Claims, 1 Drawing Figure

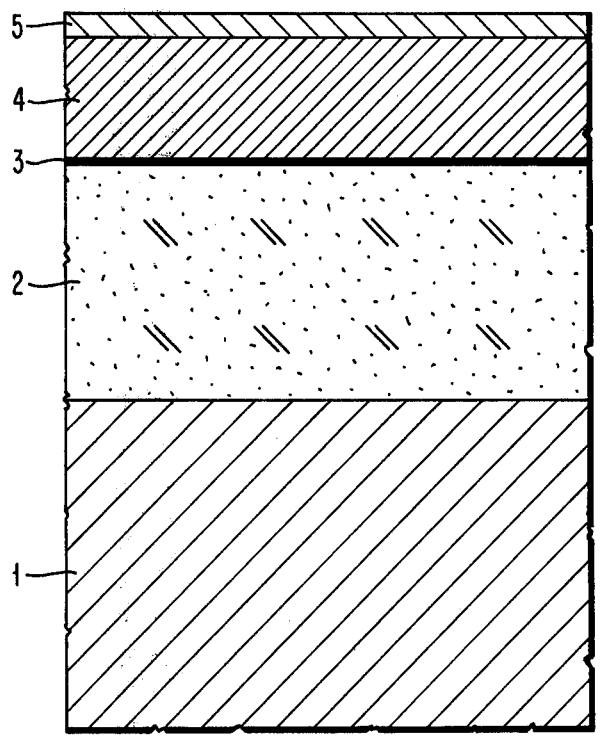

MAGNETIC RECORD CARRIER

BACKGROUND OF THE INVENTION

This invention relates generally to a dynamic magnetic information storage record medium and more specifically to a coating process wherein the substrate is treated for the magnetic layer.

1. Field of the Invention

Magnetic recording media having thin films of a magnetizable metal or alloys thereof have found a usage in the electronic data processing equipment as high storage capacity memories. Various forms of the substrate base such as films, drums, wires or disks are commonly used. The thin film metal plated magnetic recording media permits a higher storage capacity from the usual iron oxide recording media.

Generally the magnetic layer is deposited onto a substrate that is easily machinable such as an aluminum disk. But aluminum contains impurities that hinder fabricating the perfectly smooth surface required for the magnetic layer and a low flying magnetic recording transducer. Further, a galvanic action can occur between the aluminum substrate and the thin film magnetizable layer if the magnetizable layer is deposited directly onto the substrate. The galvanic action causes a corrosion of a subsequent layer and thereby causes recording errors. A synthetic substance layer solves these problems but the synthetic materials are highly gas-evolving, with a consequence of an embrittlement of the subsequent layers. The function of the present invention is to solve the problem of the use of a synthetic substance as a magnetic record carrier.

2. Description of the Prior Art

It is well known to insert different film layers between a substrate and a magnetic material layer. U.S. Pat. No. 3,116,159 to R. D. Fisher et al discloses a heat curable adhesive layer formed on a non-metallic substrate such as a polyethylene terephthalate material. The heat curable adhesive layer is a resin coating that is chemically activated to enable the substrate to receive the subsequent magnetic layer. U.S. Pat. No. 3,414,430 issued to Charles Maho, discloses the vacuum evaporation of a magnetic coating directly to a subbing layer of a synthetic elastomer which is used as an adhesive layer. The adhesive is deposited over a polyethylene terephthalate substrate. The synthetic elastomer is modified with a diisocyanate for improved smoothness.

It is also known to manufacturer a magnetic recording media by depositing an undercoat copper layer over the substrate treated by coating with an adhesive layer consisting of a dispersion of particulate iron or zinc in a binder as disclosed in U.S. Pat. No. 3,730,852 to A. Diebold et al. A ferromagnetic coating can then be deposited onto the copper undercoat layer. The copper deposition is made such that the copper exchanges the iron or zinc particles in the adhesive layer.

It is well known to insert a metal film between a substrate and a magnetic material layer. In the U.S. Pat. No. 3,150,939 to J. W. Wenner, a bonded nuclei metallized layer is bonded to a dielectric resin substrate. The magnetic layer is then deposited over the metallic undercoat layer. It is also known, as shown in the U.S. Pat. No. 3,520,664, to D. P. York, that a plurality of layers can be deposited intermediate the substrate and the magnetic layer. In the York Patent, a metallic oxide is deposited as an adhesive layer over a substrate which may be a dielectric or a conductive material. A dielectric film is deposited over the adhesive layer as an insulating layer. A metallic nucleating layer is then deposited to enhance the magnetic properties of the magnetic layer deposited onto the nucleating layer.

The prior art was sufficient for the undercoating of the magnetic layers used prior to present day technology. With the low flying transducers presently in usage, the magnetic layer must be ultra smooth. The use of a metallic undercoat to the magnetic layer for its enhancement is well known. However, this layer in itself is not sufficient to isolate the magnetic layer from the deficiencies of the synthetic substance layer. The intermediate layer to the nucleating metallic film of a York patent, for instance, does not present the resistivity required for the use in a data storage system, as the insulation layer as shown in the York patent is extremely brittle so that during processing or during use, there can appear surface fissures or cracks. Such deficiencies may not affect the magnetic thin film device as shown for use in York, but these deficiencies in the magnetizable layer of a memory record can cause data errors during writing or reading the record carrier.

It is, therefore, an object of the present invention to provide a magnetic disk structure wherein a resin layer is provided as a protective layer for the substrate, with a layer of a getter metal as an insulation to a magnetic enhancing layer and a magnetic layer.

SUMMARY OF THE INVENTION

In accordance with the present invention, a record carrier comprises a synthetic substance layer deposited onto a substrate with a thin getter metallic layer deposited over the synthetic substance layer. A metallic undercoat layer is next deposited in preparation for the subsequent magnetic film layer.

The synthetic substance layer is preferably a pigmented resin deposited on a metallic non-magnetic substrate of aluminum, for instance. The undercoat metallic layer may consist of chromium.

An object of the present invention, therefore, is to provide an enhanced magnetic recording media.

Another object of the present invention is to provide a magnetic media that eliminates or reduces a fissure causing embrittlement of a material applied onto a synthetic substance layer in a magnetic recording media.

Yet another object of this invention is to provide a getter metal layer whose oxide pigments a synthetic substance layer to increase adhesion between the synthetic substance layer and subsequent metallic layers in a magnetic recording medium.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation may be fully understood from the following description of an illustrated embodiment when read in conjunction with the accompanying drawing.

The drawing is a diagrammatic-sectional view of a record carrier in accordance with this invention.

DESCRIPTION OF THE PREFERRED EMBODIMENT

The drawing shows schematically a record carrier in accordance with the invention. The record carrier comprises a substrate 1 which may be a dielectric such as glass or ceramic material, but preferably it is a conductive material such as a highly pure aluminum or an aluminum-magnesium alloy. These materials are often used as substrates for disk memory storage. The thickness of the substrate 1 is not critical. It should, however, be such that it guarantees sufficient mechanical assistance for self-supporting. For example, metal sheets with a thickness of approximately 2.0 mm are suitable.

A synthetic substance layer 2 is deposited next onto the substrate 1. The synthetic substance may be an epoxy phenyl resin. According to the preferred embodiment, the resin can be pigmented with approximately 20% titanium dioxide $TiO_2$ and approximately 2% aluminum oxide $Al_2O_3$ of a particle size of approximately 0.5 to 1.0 microns. The synthetic substance layer may be applied to the substrate 1 in fluid form and may be evenly dispersed onto the substrate 1 by the use of a well known spin coating process. The preferred thickness of the synthetic substance layer 2 is 12,500 angstroms.

After the synthetic substance layer 2 has hardened, a thin layer of a getter material is deposited preferably by a vapor deposition process such as sputtering. The getter metal effectively absorbs the gases exiting from the synthetic substance layer 2 during the vapor deposition process. Since the exiting gases are absorbed, they cannot cause an embrittlement of the subsequent layers. A preferable getter layer metal is a thin titanium layer of approximately 250 angstroms thickness. The adhesion of the getter layer 3 is enhanced with the use of a pigmented resin in that the titanium layer forms a compound with the particles that are used to pigment the synthetic substance layer 2. The adhesion is much stronger that if the getter layer 3 is deposited onto the synthetic substance layer without pigmentation.

Subsequently, a thicker undercoat layer 4 is vapor deposited onto the getter layer 3. A suitable undercoat layer has a thickness of approximately 5,000 angstroms and is preferably of chromium to enhance a subsequent magnetic layer. It is well known that an undercoat layer 4 beneath the magnetic layer 5 decreases the stresses developed in the deposited magnetic film. While no underlying theory is proposed as to why these stresses occur, it may be hypothecated that, because of the high surface mobilities required for the deposited material to nucleat and thus form a continuous film, large energies and nucleating times are needed for crystallization thereof. The undercoat layer 4 provides these properties for the magnetic layer 5. As disclosed in the above-mentioned U.S. Pat. No. 3,520,664, the undercoat layer 4 may be selected from a group of materials such as Ag, Cr, Co, Ta, Fe, Au, Cu, Ni, Vn and Ti. The preferred material in the present invention is chromium. A vacuum deposition process such as sputtering is preferred for the deposition of the undercoat layer 4.

Superimposed next is the magnetic film layer 5. All of these previously deposited layers form the support for the actual magnetic film layer 5. The magnetic layer may comprise iron, cobalt or nickel or an alloy thereof preferably vacuum deposited. The magnetic properties of the magnetic film layer must be such that the thin film is suitable as a high density magnetic recording member. The magnetic properties of the magnetic film layer are a function of the materials, the film thickness, the angle of deposition and the underlying substrate material. The coercivity and squareness ratio magnetic properties are especially important in magnetic recording. The magnetic layer can be applied by a vapor deposition process or some other conventional process. As the magnetic layer 5 does not form a part of the present invention, no detailed reference is made to its particular composition. If desired, a protective layer of rhodium or an oxide of the magnetic layer may be formed to protect the magnetic layer from damage such as with a transcuer contact during a start and stop operation.

The magnetic layer 5 can comprise a vacuum deposited chromium-chromium oxide material as taught in U.S. Pat. No. 3,498,837 to J. K. Alstead et al and assigned to the assignee of the present invention. In that patent, a suitable source of chromium is heated in a vacuum pressure of about $10^{-4}$ Torr to cause evaporation. A coating of a 1,250 to 2,500 angstroms was found to be sufficient to impart excellent wear properties to the magnetic recording member. In that patent, a hard finish layer was formed by the chromium oxide obtained by using the soft vacuum of approximately $10^{-4}$ Torr with oxygen in the vacuum to develop the chromium oxide hard finish layer. Thus a separate hard finish protective layer is not required using the magnetic coating as taught by the Alstead et al patent.

The principles of the present invention have now been made clear in an illustrated embodiment. There will be immediately obvious to those skilled in the art, many modifications of structure, arrangement, proportions, elements, materials and components used in the practice of the invention. For instance, the selection of the substrate 1 as well as the synthetic substance layer 2, the undercoat layer 4 and the magnetic layer 5 is well within the ability of a person well skilled in the magnetic recording and deposition arts. It should be understood that the pigmentation of the synthetic substance layer 2 is not necessary for the prevention of outgassing, but is advantageous for better adhesion of the getter layer 3. Furthermore, although titanium is the preferred material for the getter layer 3, gadolinium or cerium are examples of other metals that are operable. A strong attraction to oxygen and water are necessary characteristics of the getter metal layer 3. Other oxides usable for the pigmentation of the synthetic substance layer 2 is ferro-oxide. The appended claims are, therefore, intended to cover and embrace any such modification, within the limits only of the true spirit and scope of the invention.

I claim:

1. A multi-layer magnetic record carrier, comprising:
a substrate;
a synthetic substance layer deposited onto said substrate;
a layer of getter metal vacuum deposited onto said synthetic substance layer; and
a layer of an undercoat metal vacuum deposited onto said getter metal layer, said undercoat metal layer being substantially thicker than said getter metal layer.

2. A multi-layer magnetic record carrier as defined in claim 1 wherein said synthetic substance layer is pigmented with at least one metal oxide.

3. A multi-layer magnetic record carrier as defined in claim 2 wherein said layer of getter metal consists of a metal the oxide of which serves to pigment said synthetic substance layer.

4. A multi-layer magnetic record carrier as defined in claim 1 wherein said synthetic substance layer consists of a pigmented epoxy resin.

5. A multi-layer magnetic record carrier as defined in claim 4 wherein said pigmented epoxy resin is pigmented with titanium oxide and aluminum oxide.

6. A multi-layer magnetic record carrier as defined in claim 5 wherein said layer of getter metal consists of titanium.

7. A multi-layer magnetic record carrier as defined in claim 1 wherein said undercoat metal is chromium.

8. A multi-layer magnetic record as defined in claim 1 wherein said synthetic substance layer is a thickness of approximately 12500 Angstroms, said getter metal layer is approximately 250 Angstroms thick, and said undercoat metal layer is approximately 5000 Angstroms thick.

9. A multi-layer magnetic record carrier as defined in claim 1 wherein said synthetic substance layer is pigmented with titanium oxide and aluminum oxide.

10. A multi-layer magnetic record carrier as defined in claim 9 wherein said getter metal layer consists of approximately 250 Angstroms of titanium.

11. A multi-layer magnetic record carrier as defined in claim 9 wherein said synthetic substance layer is an epoxy resin pigmented with approximately 20% titanium dioxide and approximately 2% aluminum oxide.

12. A multi-layer, magnetic record carrier for a ferromagnetic recording layer comprising:
a substantially rigid substrate;
a synthetic substance layer pigmented with titanium oxide and aluminum oxide deposited onto said substrate;
a thin layer of titanium vacuum deposited as a getter metal onto said synthetic substance layer such that the titanium layer prevents outgassing from said synthetic substance layer; and
a layer of an undercoat metal vacuum deposited onto said titanium layer, said undercoat metal layer being substantially thicker than said titanium layer.

13. A multi-layer magnetic record carrier as defined in claim 12 wherein said synthetic substance layer is an epoxy resin pigmented with 20% titanium oxide and 2% aluminum oxide.

14. A multi-layer magnetic record carrier as defined in claim 12 wherein said synthetic substance layer is a thickness of approximately 12,500 Angstroms, said getter metal layer is approximately 250 Angstroms thick, and said undercoat metal layer is approximately 5000 Angstroms thick.

* * * * *